(12) United States Patent
Obrecht et al.

(10) Patent No.: US 7,939,594 B2
(45) Date of Patent: May 10, 2011

(54) COMPOSITIONS THAT CONTAIN MICROGELS AND THICKENING AGENTS

(75) Inventors: Werner Obrecht, Moers (DE); Torsten Ziser, Birkenau (DE); Thomas Früh, Limburgerhof (DE); Patrick Galda, Karlsruhe (DE); Achim Fessenbecker, Waghäusel (DE)

(73) Assignees: Rhein Chemie Rheinau GmbH, Mannheim (DE); LANXESS Deutschland GmbH, Leverkusen (DE)

( * ) Notice: Subject to any disclaimer, the term of this patent is extended or adjusted under 35 U.S.C. 154(b) by 673 days.

(21) Appl. No.: 11/374,364

(22) Filed: Mar. 13, 2006

(65) Prior Publication Data

US 2006/0252858 A1    Nov. 9, 2006

(30) Foreign Application Priority Data

Mar. 24, 2005  (DE) .......................... 10 2005 014 272

(51) Int. Cl.
| | |
|---|---|
| C08K 5/01 | (2006.01) |
| C08K 7/16 | (2006.01) |
| C08F 8/00 | (2006.01) |
| C08L 37/00 | (2006.01) |
| C08L 27/04 | (2006.01) |
| C08L 33/02 | (2006.01) |
| C08L 9/00 | (2006.01) |
| C08L 33/18 | (2006.01) |
| C08L 23/00 | (2006.01) |
| C08L 25/02 | (2006.01) |

(52) U.S. Cl. ........ 524/474; 523/223; 525/191; 525/192; 525/194; 525/195; 525/208; 525/213; 525/221; 525/232; 525/233; 525/235; 525/236; 525/237; 525/238; 525/240; 525/241

(58) Field of Classification Search ................. 524/474; 523/223; 525/191, 192, 194, 195, 208, 213, 525/221, 232, 233, 235, 236, 237, 238, 240, 525/241
See application file for complete search history.

(56) References Cited

U.S. PATENT DOCUMENTS

| | | | |
|---|---|---|---|
| 2,187,146 A | 1/1940 | Calcott et al. | 18/57 |
| 4,360,620 A | 11/1982 | Lindner et al. | 524/234 |
| 5,124,408 A | 6/1992 | Engels et al. | 525/215 |
| 5,238,977 A | 8/1993 | Piejko et al. | 523/201 |
| 5,302,696 A | 4/1994 | Schiessl | 528/487 |
| 5,395,891 A | 3/1995 | Obrecht et al. | 525/194 |
| 5,442,009 A | 8/1995 | Parker et al. | 524/555 |
| 6,127,488 A | 10/2000 | Obrecht et al. | 525/333.3 |

(Continued)

FOREIGN PATENT DOCUMENTS

EP    953 615    11/1999

(Continued)

OTHER PUBLICATIONS

Chinese Journal of Polymer Science, vol. 20, No. 2 (2002), 93-98 Special Effect of Ultra Fine Rubber Particles on Plastic Toughening, (2002).

(Continued)

*Primary Examiner* — William K Cheung
(74) *Attorney, Agent, or Firm* — Nicanor A. Kohncke

(57) ABSTRACT

The invention provides a composition that contains at least one specific non-crosslinkable organic medium at least one microgel and at least one thickening agent, a process for the preparation thereof and uses of the compositions.

32 Claims, 1 Drawing Sheet

MODE OF FUNCTIONING OF THE HOMOGENISER VALVE

U.S. PATENT DOCUMENTS

| | | | | |
|---|---|---|---|---|
| 6,133,364 | A | 10/2000 | Obrecht et al. | 524/495 |
| 6,184,296 | B1 | 2/2001 | Obrecht et al. | 525/232 |
| 6,207,757 | B1 | 3/2001 | Obrecht et al. | 525/194 |
| 6,242,534 | B1 | 6/2001 | Obrecht et al. | 525/191 |
| 6,372,857 | B1 | 4/2002 | Obrecht et al. | 525/332.6 |
| 6,399,706 | B1 * | 6/2002 | Obrecht et al. | 525/191 |
| 6,573,346 | B1 | 6/2003 | Melchiors et al. | 526/217 |
| 6,579,945 | B2 | 6/2003 | Obrecht et al. | 525/192 |
| 6,620,886 | B2 | 9/2003 | Obrecht et al. | 525/191 |
| 6,632,888 | B2 | 10/2003 | Obrecht et al. | 525/215 |
| 6,649,696 | B2 | 11/2003 | Obrecht et al. | 525/125 |
| 6,737,478 | B2 | 5/2004 | Obrecht et al. | 525/133 |
| 2001/0051685 | A1 | 12/2001 | Obrecht et al. | 524/526 |
| 2002/0002683 | A1 | 1/2002 | Benson et al. | 713/194 |
| 2002/0082364 | A1 | 6/2002 | Obrecht et al. | 525/535 |
| 2005/0182158 | A1 * | 8/2005 | Ziser et al. | 523/223 |
| 2005/0197443 | A1 * | 9/2005 | Ziser et al. | 524/474 |
| 2006/0254734 | A1 | 11/2006 | Hannay et al. | 162/134 |
| 2006/0275690 | A1 | 12/2006 | Fessenbecker et al. | 430/137.15 |
| 2006/0275691 | A1 | 12/2006 | Fessenbecker et al. | 430/137.15 |
| 2007/0135573 | A1 | 6/2007 | Ziser et al. | 525/119 |
| 2007/0232733 | A1 | 10/2007 | Ziser et al. | 524/386 |
| 2008/0064768 | A1 | 3/2008 | Ziser et al. | 516/98 |
| 2008/0249241 | A1 | 10/2008 | Heiliger et al. | 525/50 |

FOREIGN PATENT DOCUMENTS

| | | |
|---|---|---|
| GB | 1078400 | 8/1967 |
| JP | 2004 292693 | 10/2004 |

OTHER PUBLICATIONS

H.G. Elias, Makromolekule, vol. 2,Technologie, 5th Edition, 1992, pp. 99 et seq.

Ullmanns Enzyklopadie der technischen Chemie, Verlag Chemie Weinheim, vol. 20 (1981) 457 et seq.; 504, 507 eq seq; 517/518, 524, (1981).

Brock, Thomas, Groteklaes, Michael, Mischke, Peter, Lehrbuch der Lacktechnologie, Curt R. Vincentz Verlag hannover (1998) 93 et seq.

* cited by examiner

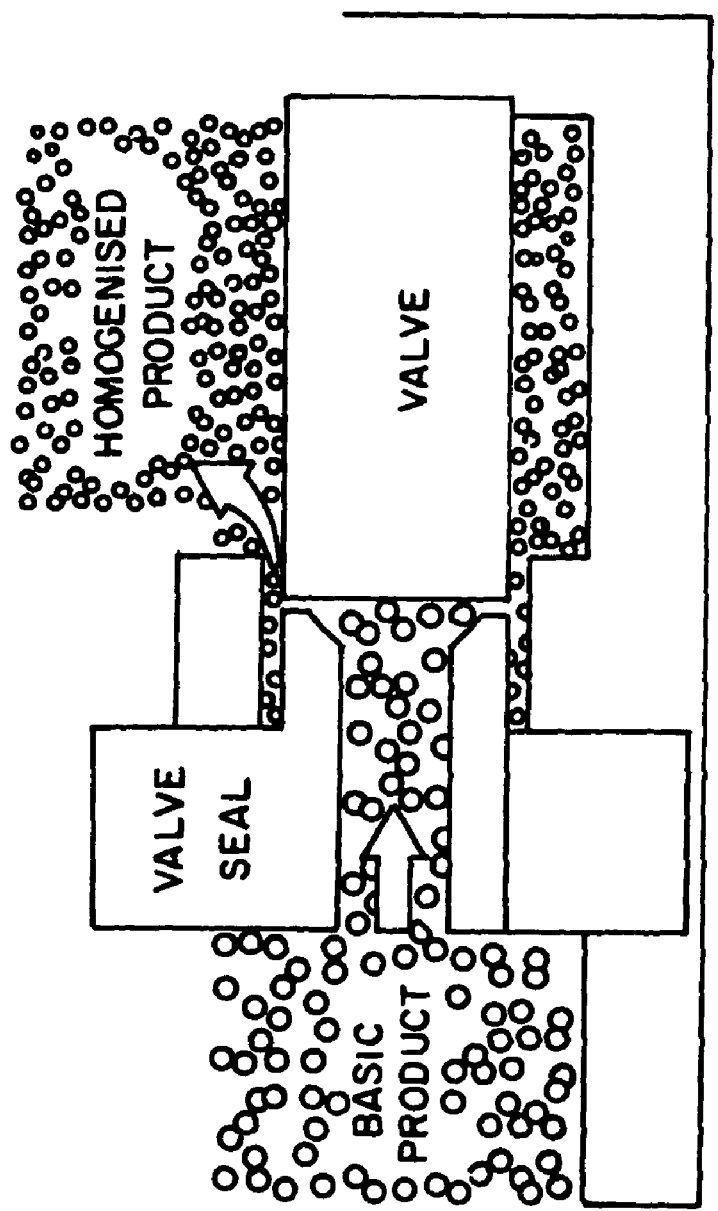
FIG. 1  MODE OF FUNCTIONING OF THE HOMOGENISER VALVE

COMPOSITIONS THAT CONTAIN MICROGELS AND THICKENING AGENTS

The invention provides a composition that contains at least one specific non-crosslinkable organic medium, at least one microgel and at least one thickening agent, a process for the preparation thereof, use of the compositions, and polymers, rubbers, lubricants, coatings etc. that contain the composition.

The use of rubber gels, also modified rubber gels, admixed with a wide variety of rubbers, for example to improve the rolling resistance of motor vehicle tires, has been disclosed (see e.g. DE 42 20 563, GB-PS 10 78 400, EP 405 216 and EP 854 171). In these cases the rubber gels are always incorporated in solid matrices.

The incorporation of printing ink pigments finely distributed in liquid media suitable for this purpose, in order ultimately to produce printing inks, has also been disclosed (see e.g. EP 0 953 615 A2, EP 0 953 615 A3). In these cases, particle sizes of down to 100 nm have been achieved.

The use of rubber gels as solid components in mixtures with liquid organic media is not described in the documents mentioned.

In Chinese Journal of Polymer Science, vol. 20, no. 2 (2002), 93-98, microgels that are fully crosslinked by energy-rich radiation and the use thereof to increase the impact resistance of plastics are described.

DE 2910154 discloses dispersions of rubber particles with organic solvents.

DE-A-3742180 discloses dispersions of silicon-containing graft polymers in liquid amides, that likewise are prepared from aqueous latices.

Microgel-containing compositions have been described in detail in International application PCT/EP2004/052290 from the present applicant, this not being a prior publication.

The inventors of the present invention have now found that it is possible to finely distribute microgels together with thickening agents in liquid organic media of a certain viscosity, for example using a homogenizer, and were thus able to provide new compositions that have interesting properties, in particular rheological properties that appear to be suitable for a large number of applications, for example in lubricants, etc. The inventors completed their invention on the basis of this finding.

Microgel and thickening agent-containing compositions were found, for which a wide range of rheological behavior was established. Surprisingly, a very high structural viscosity or thixotropy, but also flow behavior similar to that of Newton's liquids was found in suitable microgel and thickening agent-containing compositions. This can be used in a targeted manner to control the flow behavior, in addition to other properties, of any liquid compositions at all via the combination of microgels and thickening agents.

Thus, by the combination of microgels and thickening agents, properties such as sedimentation stability, transparency, oil separation, dropping point, penetration, consistency, shear stability, friction values, wear behavior, etc., can be adjusted in a desired manner, wherein synergies were also discovered, so that very interesting greases are obtained.

The present invention thus provides a composition containing at least one non-crosslinkable organic medium (A) that has a viscosity of less than 30000 mPas at a temperature of 120° C., at least one microgel (B) and at least one thickening agent (C).

The viscosity of the organic medium is preferably less than 1000 mPas, more preferably less than 200 mpas, even more preferably less than 100 mPas at 120° C., particularly preferably less than 20 mPas at 120° C. The dynamic viscosity of the non-crosslinkable organic medium (A) is determined at 120° C. at a speed of 5 $s^{-1}$ using a cone-and-plate measurement system according to DIN 53018.

BRIEF DESCRIPTION OF THE DRAWINGS

FIG. 1 is an illustrative representation of the mode of functioning of a homogenizer valve as described herein.

Microgels (B)

The microgel (B) used in the composition according to the invention is a crosslinked microgel. In a preferred embodiment, it is not a microgel crosslinked by energy-rich radiation. Here, energy-rich radiation is expediently meant to be electromagnetic radiation with a wavelength of less than 0.1 μm. The use of microgels crosslinked by energy-rich radiation, such as are described, for example, in Chinese Journal of Polymer Science, vol. 20, no. 2 (2002), 93-98, is a disadvantage because in practice microgels crosslinked by energy-rich radiation cannot be produced on an industrial scale. In addition, the use of energy-rich radiation from radioactive sources of radiation such as radioactive cobalt is associated with serious safety problems. Furthermore, since radiation crosslinked microgels are generally fully radiation crosslinked microgels, the change in module during incorporation of the composition according to the invention, for example in plastics, is directly from the matrix phase to the dispersed phase. This can lead to abrasion effects between the matrix and the dispersed phase due to sudden stresses, which means that the mechanical properties, the swelling behavior and stress cracking etc. are adversely affected when using microgel-containing plastics produced using compositions according to the invention.

In a preferred embodiment of the invention, the primary particles in microgel (B) have an approximately spherical geometry. The particles called primary particles are, in accordance with DIN 53206:1992-08, those microgel particles dispersed in the coherent phase that can be recognized as individuals using an appropriate physical process (electron microscope) (cf. e.g. Römpp Lexikon, Lacke und Druckfarben, Georg Thieme Verlag, 1998). "Approximately spherical" geometry means that the dispersed primary particles in the microgels when viewed in the composition, for example using an electron microscope, can be recognized in that they are depicted by a substantially circular area. Since the microgels do not substantially change their shape or morphology during further processing of compositions according to the invention, the details given above and below also apply in the same way to microgel-containing compositions obtained using the composition according to the invention, such as e.g. plastics, coating agents, lubricants or the like.

With regard to the primary particles in microgel (B) present in the composition according to the invention, the difference in the diameters of an individual primary particle, defined as $$[(d1-d2)/d2]\times 100,$$

in which d1 and d2 are any two diameters of the primary particle and d1>d2, is preferably less than 250%, more preferably less than 100%, even more preferably less than 80%, particularly preferably less than 50%.

Preferably at least 80%, more preferably at least 90%, particularly preferably at least 95% of the primary particles in the microgel has a difference in diameters, defined as $$[(d1-d2)/d2]\times 100,$$

in which d1 and d2 are any two diameters of the primary particle and d1>d2, of less than 250%, more preferably less than 100%, even more preferably less than 80%, particularly preferably less than 50%.

The previously mentioned difference in diameters of the individual particles can be determined using the following method. First of all, a thin layer of the solidified composition according to the invention is prepared. Then a transmission electron microscope image is taken at a magnification of for example 10 000 times or 200 000 times. Within an area of 833.7×828.8 nm, the largest and smallest diameters, as d1 and 2, are determined for 10 microgel primary particles. If the differences defined above for at least 80%, preferably at least 90%, more preferably at least 95% of the measured primary particles are each less than 250%, preferably less than 100%, more preferably less than 80%, particularly preferably less than 50%, then the microgel primary particles exhibit the feature relating to difference defined above.

If the concentration of microgels in the composition is so high that there is a high degree of overlapping of the visible microgel primary particles, then evaluation can be improved by prior and appropriate dilution of the measurement sample.

In the composition according to the invention, the primary particles in microgel (B) preferably have an average particle diameter of 5 to 500 nm, more preferably 20 to 400 nm, even more preferably 20 to 300 nm, particularly preferably 20 to 250 nm, more particularly preferably 20 to 99 nm, very particularly preferably 40 to 80 nm (diameter data according to DIN 53206). The production of particularly finely divided microgels by emulsion polymerization is achieved by controlling the reaction parameters in a manner known per se (see e.g. H. G. Elias, Makromoleküle, vol. 2, Technologie, 5th edition, 1992, pages 99 et seq).

Since the morphology of the microgels is substantially unchanged during further processing of the composition according to the invention, the average particle diameter of the dispersed primary particles corresponds substantially to the average particle diameter of the dispersed primary particles in the further processed products obtained with the composition according to the invention, such as microgel-containing plastics, lubricants, coatings etc. This is a particular advantage of the composition according to the invention. Purchasers can be provided, to a certain extent, with tailor-made, liquid, storage-stable microgel formulations in which the microgels have a defined morphology and that can be readily further processed by the purchaser in the desired applications. Previous costly dispersion, homogenization or even production of the microgels is no longer required, which is why it is expected that these types of microgels will also find use in areas in which their application has hitherto been regarded as too costly.

In the composition according to the invention, microgels (B) expediently have a proportion (gel content) of at least 30 wt. %, preferably at least about 70 wt. %, more preferably at least about 80 wt. %, even more preferably at least about 90 wt. % that is insoluble in toluene at 23° C.

The proportion insoluble in toluene is determined in toluene at 23° C. For this purpose, 250 mg of the microgel are swollen in 20 ml of toluene at 23° C. for 24 hours, with shaking. After centrifuging at 20,000 rpm, the insoluble fraction is separated and dried. The gel content is given by the quotient of the dried residue and the amount initially weighed out and is cited as a percentage by weight.

In the composition according to the invention, microgels (B) expediently have a swelling index in toluene at 23° C. of less than about 80, preferably less than 60, more preferably less than 40. Thus, the swelling indices of the microgels (Qi) is particularly preferably between 1-15 and 1-10. The swelling index is calculated from the weight of solvent-containing microgel (after centrifuging at 20,000 rpm) that has been swollen in toluene at 23° C. for 24 hours and the weight of dry microgel:

$Qi$=wet weight of the microgel/dry weight of the microgel.

To determine the swelling index, 250 mg of the microgel may be swollen in 25 ml of toluene for 24 hours, with shaking. The gel is centrifuged off and weighed and then dried to constant weight at 70° C. and weighed again.

In the composition according to the invention, microgels (B) expediently have glass transition temperatures Tg of −100° C. to +120° C., preferably −100° C. to +100° C., more preferably −80° C. to +80° C. In rare cases, microgels may also be used that do not have a glass transition temperature due to the high degree of crosslinking.

Furthermore, microgels (B) used in the composition according to the invention preferably have a width of glass transition of greater than 5° C., preferably greater than 10° C., more preferably greater than 20° C. Microgels that have this width of glass transition are generally, in contrast to completely homogeneously radiation-crosslinked microgels, not completely homogeneously crosslinked. This means that the change in module is not directly from the matrix phase to the dispersed phase in, for example, microgel-containing plastics compositions produced from compositions according to the invention. This means that any sudden stresses in these compositions do not lead to abrasion effects between the matrix and the dispersed phase, so the mechanical properties, the swelling behavior and stress cracking are affected in a beneficial manner.

The glass transition temperatures (Tg) and the width of glass transition (ΔTg) of the microgels are determined by differential thermal analysis (DTA, also called Differential-Scanning-Calorimetry (DSC)) under the following conditions:

To determine Tg and ΔTg, two cooling/heating cycles are performed. Tg and ΔTg are determined during the second heating cycle. For the determinations, 10-12 mg of the chosen microgel is placed in a Perkin-Elmer DSC sample-holder (standard aluminum pan). The first DSC cycle is performed by first cooling the sample to −100° C. with liquid nitrogen and then heating to +150° C. at a rate of 20K/min. The second DSC cycle is started by carefully cooling the sample, as soon as a sample temperature of +150° C. has been reached. Cooling is performed at a rate of approximately 320 K/min. In the second heating cycle, the sample is heated once more to +150° C., as in the first cycle. The rate of heating in the second cycle is again 20K/min. Tg and. ΔTg are determined graphically from the DSC curve plotted out for the second heating procedure. For this purpose, three straight lines are drawn on the DSC curve. The 1st straight line is drawn along the part of the DSC curve below Tg, the 2nd straight line is drawn along the part of the curve running through Tg, with a point of inflexion and the 3rd straight line is drawn along the part of the DSC curve located above Tg. Three straight lines with two points of intersection are obtained in this way. The two points of intersection are each identified by a characteristic temperature. The glass transition temperature Tg is obtained as the mean of these two temperatures and the width of glass transition ΔTg is obtained from the difference between the two temperatures.

The microgels present in the composition according to the invention, preferably not crosslinked by energy-rich radiation, can be prepared in a manner known per se (see for example EP-A-405 216, EP-A-854171, DE-A 422 0563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311. 2 and DE 100 61 174.5). Patent (applications) EP-A 405 216, DE-A 4220563 and GB-PS 1078400 claim the use of CR, BR and NBR microgels in mixtures with double bond-containing rubbers. DE 197 01 489.5 describes the use of subsequently modified microgels in mixtures with double bond-containing rubbers such as NR, SBR and BR.

Microgels are expediently understood to be rubber particles that are obtained in particular by crosslinking the following rubbers:
BR: polybutadiene
ABR: butadiene/C1-C4-alkyl acrylate copolymers
IR: polyisoprene
SBR: styrene-butadiene copolymers with styrene contents of 1-60, preferably 5-50 wt. %
X-SBR: carboxylated styrene-butadiene copolymers
FKM: fluorinated rubber
ACM: acrylate rubber
NBR: polybutadiene-acrylonitrile copolymers with acrylonitrile contents of 5-60, preferably 10-50 wt. %
X-NBR: carboxylated nitrile rubbers
CR: polychloroprene
IIR: isobutylene/isoprene copolymers with isoprene contents of 0.5-10 wt. %
BIIR: brominated isobutylene/isoprene copolymers with bromine contents of 0.1-10 wt. %
CIIR: chlorinated isobutylene/isoprene copolymers with chlorine contents of 0.1-10 wt. %
HNBR: partly and fully hydrogenated nitrile rubbers
EPDM: ethylene-propylene-diene copolymers
EAM: ethylene/acrylate copolymers
EVM: ethylene/vinylacetate copolymers
CO and ECO: epichlorohydrin rubbers
Q: silicone rubbers, with the exception of silicone graft polymers
AU: polyesterurethane polymers
EU: polyetherurethane polymers
ENR: epoxidised natural rubber or mixtures thereof.

The non-crosslinked microgel starting products are expediently produced by the following methods:
1. emulsion polymerization
2. solution polymerization of rubbers that are not accessible via variant 1,
3. in addition, naturally occurring latices such as e.g. natural rubber latex may be used.

In the composition according to the invention, the microgels (B) used are preferably those that are obtainable by emulsion polymerization and crosslinking.

When preparing the microgels used according to the invention by emulsion polymerization, the following radically polymerizable monomers are used, for example: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene, and double bond-containing carboxylic acids such as e.g. acrylic acid, methacrylic acid, maleic acid, itaconic acid, etc., double bond-containing hydroxy compounds such as e.g. hydroxyethyl methacrylate, hydroxyethyl acrylate, hydroxybutyl methacrylate, amine-functionalized (meth)acrylates, acrolein, N-vinyl-2-pyrrolidone, N-allyl-urea and N-allyl-thiourea as well as secondary amino-(meth)acrylates such as 2-tert-butylaminoethyl methacrylate and 2-tert-butylamino-ethyl methacrylamide, etc. The rubber gels can be crosslinked directly during emulsion polymerization, such as by means of copolymerization with crosslinking-active multifunctional compounds or by subsequent crosslinking as is described below. Direct crosslinking of the rubber gel is a preferred embodiment of the invention. Preferred multifunctional comonomers are compounds with at least two, preferably 2 to 4, copolymerizable C=C double bonds such as diisopropenylbenzene, divinylbenzene, divinyl ether, divinyl sulfone, diallyl phthalate, triallyl cyanurate, triallyl isocyanurate, 1,2-polybutadiene, N,N'-m-phenylene maleic imide, 2,4-toluylene-bis(maleic imide) and/or triallyl trimellitate. In addition, the acrylates and methacrylates of polyhydric, preferably 2- to 4-hydric C2 to C10 alcohols such as ethylene glycol, propanediol-1,2, butanediol, hexanediol, polyethylene glycol with 2 to 20, preferably 2 to 8, oxyethylene units, neopentyl glycol, bisphenol-A, glycerol, trimethylolpropane, pentaerythritol, sorbitol with unsaturated polyesters of aliphatic di- and polyols as well as maleic acid, fumaric acid and/or itaconic acid, are also sutiable.

Crosslinking to give rubber microgels during emulsion polymerization can also take place by continuing polymerization up to high conversions or in the monomer feed process by polymerization with high internal conversions. Another possibility comprises also performing emulsion polymerization in the absence of chain transfer agents.

To crosslink the non-crosslinked or weakly crosslinked microgel starting products following emulsion polymerization, it is best to use the latices that are obtained during emulsion polymerization. In principle this method can also be applied to non-aqueous polymer dispersions that are obtainable in a different way, e.g. by redissolution. Natural rubber latices can also be crosslinked in this way.

Suitable crosslinking-active chemicals are, for example, organic peroxides such as dicumyl peroxide, t-butylcumyl peroxide, bis-(t-butyl-peroxy-isopropyl)benzene, di-t-butyl peroxide, 2,5-dimethylhexan-2,5-dihydroperoxide, 2,5-dimethylhexyn-3,2,5-dihydroperoxide, dibenzoyl peroxide, bis-(2,4-dichlorobenzoyl) peroxide, t-butyl perbenzoate and organic azo compounds such as azo-bis-isobutyronitrile and azo-bis-cyclohexanonitrile as well as di- and polymercaptan compounds such as dimercaptoethane, 1,6-dimercaptohexane, 1,3,5-trimercaptotriazine and mercapto-terminated polysulfide rubbers such as mercapto-terminated reaction products of bis-chloroethyl formal and sodium polysulfide.

The optimum temperature for performing post-crosslinking naturally depends on the reactivity of the crosslinking agent and it can be performed at temperatures from room temperature up to about 180° C., optionally under elevated pressure (see Houben-Weyl, Methoden der organischen Chemie, 4th edition, vol, 14/2, page 848). Particularly preferred crosslinking agents are peroxides.

The crosslinking of C=C double bond-containing rubbers to give microgels can also be performed in dispersion or emulsion with simultaneous partial or optionally complete hydrogenation of the C=C double bond by hydrazine, as described in U.S. Pat. Nos. 5,302,696 or 5,442,009, or optionally other hydrogenation agents, for example organometallic hydride complexes.

Particle enlargement by agglomeration may optionally be performed before, during or after post-crosslinking.

In the case of the method of preparation preferably used according to the invention, without the use of energy-rich radiation, incompletely homogeneously crosslinked microgels are always obtained and these may have the advantages described above.

Rubbers that have been prepared by solution polymerization may also be used as starting products for the preparation of microgels. In these cases, the process starts from solutions of these rubbers in suitable organic solutions.

The desired size for the microgels is produced by mixing the rubber solution in a liquid medium, preferably water, optionally with the addition of suitable surface-active auxiliary agents such as e.g. surfactants, using appropriate equipment, so that a dispersion of the rubber in a suitable particle size range is obtained. To crosslink the dispersed solution rubber, the same procedure is used as that described above for the subsequent crosslinking of emulsion polymers. Suitable crosslinking agents are the compounds mentioned above, wherein the solvent used to prepare the dispersion is optionally removed, e.g. by distillation, before the crosslinking procedure.

The microgels used to produce the composition according to the invention may be either non-modified microgels that have substantially no reactive groups, in particular on the surface, and also modified microgels that are modified with functional groups, in particular at the surface. The latter can be produced by chemical conversion of the already crosslinked microgels with chemicals that can react with C=C double bonds. These reactive chemicals are in particular those compounds with the aid of which polar groups such as e.g. aldehyde, hydroxyl, carboxyl, nitrile etc. as well as sulfur-containing groups such as e.g. mercapto, dithiocarbamate, polysulfide, xanthogenate, thiobenzthiazole and/or dithiophosphoric acid groups and/or unsaturated dicarboxylic acid groups can be chemically bonded to the microgels. This also applies to N,N'-m-phenylenediamine. The objective of microgel modification is to improve the microgel compatibility when the composition according to the invention is used for the production of the subsequent matrix in which the microgel is incorporated, or the composition according to the invention is used for incorporation into a matrix, in order to achieve good distributability during production and also good bonding.

Particularly preferred methods of modification are grafting the microgel with functional monomers as well as reacting with low molecular weight agents.

To graft the microgels with functional monomers, the aqueous microgel dispersion is expediently used as the starting material, and this is reacted with polar monomers such as acrylic acid, methacrylic acid, itaconic acid, hydroxyethyl (meth)acrylate, hydroxypropyl (meth)acrylate, hydroxybutyl (meth)acrylate, acrylamide, methacrylamide, acrylonitrile, acrolein, N-vinyl-2-pyrrolidone, N-allyl-urea and N-allyl-thiourea as well as secondary amino (meth)acrylates such as 2-tert-butylaminoethyl methacrylate and 2-tert-butylaminoethyl methacrylamide under the conditions of a radical emulsion polymerization. Microgels with a core/shell morphology are obtained in this way, wherein the shell is intended to have a high degree of compatibility with the matrix. It is desirable that the monomer used in the modification step is grafted as quantitatively as possible onto the non-modified microgel. The functional monomers are expediently added before complete crosslinking of the microgels.

In principle, grafting of the microgel in non-aqueous systems is also conceivable, wherein modification with monomers by ionic polymerization methods is also possible in this way.

The following reagents are particularly suitable for surface modification of microgels with low molecular weight agents: elemental sulfur, hydrogen sulfide and/or alkyl polymercaptans such as 1,2-dimercaptoethane or 1,6-dimercaptohexane, also dialkyl and dialkylaryl dithiocarbamates such as the alkali metal salts of dimethyl dithiocarbamate and/or dibenzyl dithiocarbamate, further alkyl and aryl xanthogenates such as potassium methyl xanthogenate and sodium isopropyl xanthogenate as well as reaction with alkali or alkaline earth metal salts of dibutyl dithiophosphoric acid and dioctyl dithiophosphoric acid as well as dodecyl dithiodiphosphoric acid. The reactions mentioned may advantageously also be performed in the presence of sulfur, wherein the sulfur is incorporated by the formation of polysulfidic bonds. For the addition of this compound, radical starters such as organic and inorganic peroxides and/or azo initiators may be added.

Modification of double bond-containing microgels such as e.g. by means of ozonolysis or by halogenation with chlorine, bromine or iodine, is also possible. The further reaction of modified microgels, such as e.g. the production of hydroxyl group-modified microgels from epoxidized microgels, is also understood to be a chemical modification of microgels.

In a preferred embodiment, the microgels are modified by hydroxyl groups, in particular also at the surface of the microgels. The hydroxyl group content of the microgels is determined by reaction with acetanhydride and titration of the acetic acid then being released with KOH in accordance with DIN 53240 as a hydroxyl value with the units mg KOH/g of polymer. The hydroxyl value of the microgels is preferably between 0.1 and 100, more preferably between 0.5 and 50 mg KOH/g of polymer.

The amount of modification agent used is governed by its effectiveness and the requirements specified in the individual case and is in the range 0.05 to 30 wt. %, with respect to the total amount of rubber-microgel used, particularly preferably 0.5-10 wt. % with respect to the total amount of rubber gel.

The modification reactions may be performed at temperatures of 0-180° C., preferably 20-95° C., optionally under a pressure of 1-30 bar. Modification may take place on the rubber-microgel in bulk or in the form of its dispersion, wherein in the latter case inert organic solvents or even water may be used as the reaction medium. Modification is particularly preferably performed in an aqueous dispersion of the crosslinked rubber.

The use of non-modified microgels is particularly preferred for compositions according to the invention that are used for incorporation into non-polar rubbers or non-polar thermoplastic materials such as, for example, polypropylene, polyethylene and block copolymers based on styrene, butadiene, isoprene (SBR, SIR) and hydrogenated isoprene-styrene block copolymers (SEBS), and conventional TPE-Os and TPE-Vs, etc.

The use of modified microgels is preferred in particular for compositions according to the invention that are used for incorporation into polar rubbers or polar thermoplastic materials (A) such as, for example, PA, TPE-A, PU, TPE-U, PC, PET, PBT, POM, PMMA, PVC, ABS, PTFE, PVDF, etc.

The average diameter of the microgels prepared can be adjusted with great accuracy, for example to 0.1 micrometers (100 nm) ±0.01 micrometer (10 nm), so that for example a particle size distribution can be achieved in which at least 75% of all the microgel particles have a size between 0.095 micrometer and 0.105 micrometer. Other average diameters of the microgels in particular in the range between 5 and 500 nm can be produced and adjusted with the same degree of accuracy (at least 75 wt. % of all the particles are located around the maximum of the integrated particle size distribution curve (determined by light scattering), within a range of ±10% above and below the maximum). This means that the morphology of the microgels dispersed in the composition according to the invention can be adjusted to be virtually "spot on" and the properties of the composition according to the invention and of the, for example, plastics materials produced therefrom can be adjusted in this way.

Processing of the microgels prepared in this way, preferably those based on BR, SBR, NBR, SNBR, or acrylonitrile or ABR can be achieved, for example, by means of evaporation, coagulation, co-coagulation with another latex polymer, freeze-coagulation (see U.S. Pat. No. 2,187,146) or by spray-drying. When processing by spray-drying, flow promoters such as for example $CaCO_3$ or silica can also be added, as is standard practice.

In a preferred embodiment of the composition according to the invention, microgel (B) is based on rubber.

In a preferred embodiment of the composition according to the invention, microgel (B) is modified by functional groups that can react with C=C double bonds.

In a preferred embodiment, microgel (B) has a swelling index in toluene of 1 to 15 at 23° C.

The composition according to the invention has a viscosity of preferably 2 mPas to 50000000 mpas, more preferably 50 mPas to 3000000 mPas at a speed of 5 $s^{-1}$ measured using a cone-and-plate viscometer in accordance with DIN 53018, at 20° C.

Organic Non-Crosslinkable Medium (A)

The composition according to the invention contains at least one organic medium (A) that has a viscosity of less than 30000 mPas at temperature of 120° C., preferably less than 1000 mpas, more preferably less than 200 mpas, even more preferably less than 100 mpas, particularly preferably less than 20 mPas at 120° C.

Such a medium is liquid to solid at room temperature (2° C.), preferably liquid or pourable.

An organic medium in the context of the invention means that the medium contains at least one carbon atom.

Non-crosslinked media in the context of the invention are understood to be in particular those that do not contain any groups that can be crosslinked via heteroatom-containing functional groups or C=C groups, such as in particular conventional monomers or prepolymers that are conventionally crosslinked or polymerized in the conventional manner, radically, using UV rays, thermally and/or by polyaddition or polycondensation on the addition of crosslinking agents (e.g. polyisocyanates, polyamines, acid anhydrides) etc., with the formation of oligomers or polymers. According to the invention, media that may be used as organic non-crosslinkable media are also those media that, although they contain for example a certain proportion of unsaturated bonds (certain polyester oils, rape seed oil, etc.) or hydroxy groups (polyethers), they are not polymerized or crosslinked in a conventional manner to give oligomers or polymers. Non-crosslinkable media are in particular also solvents, in particular those according to DIN 55 945.

The non-crosslinkable medium (A) is preferably a non-crosslinkable medium that is liquid at room temperature (20° C.), in particular hydrocarbons (straight chain, branched, cyclic, saturated, unsaturated and/or aromatic hydrocarbons with 1 to 200 carbon atoms that optionally may be substituted with one or more substituents chosen from halogens, such as chlorine, fluorine, hydroxy, oxo, amino, carboxy, carbonyl, aceto, amido), synthetic hydrocarbons, polyether oils, ester oils, phosphates, silicon-containing oils and halogenated hydrocarbons or a fully halogenated hydrocarbon (see e.g. Ullmanns Enzyklopädie der technischen Chemie, Verlag Chemie Weinheim, vol. 20 (1981) 457 et seq, 504, 507 et seq, 517/518, 524).

These non-crosslinkable media (A) are characterized in particular by viscosities of 2 to 1500 $mm^2/s$ (cST) at 40° C. The non-crosslinkable medium (A) is preferably a non-crosslinkable medium that is liquid at room temperature (20° C.), in particular solvents according to DIN 55 945 such as xylene, solvent naphtha, methyl ethyl ketone, methoxypropyl acetate, N-methylpyrrolidone, dimethyl sulfoxide.

The synthetic hydrocarbons are obtained by polymerization of olefins, condensation of olefins or chlorinated paraffins with aromatic compounds or dechlorinating condensation of chloroparaffins. Examples of polymer oils are ethylene polymers, propylene polymers, polybutenes, polymers of higher olefins, alkyl aromatic compounds. The ethylene polymers have molecular weights between 400 and 2000 g/mol. The polybutenes have molecular weights between 300 and 1500 g/mol.

In the case of polyether oils, the following have to be differentiated: aliphatic polyether oils, polyalkylene glycols, in particular polyethylene and polypropylene glycols, mixed polymers of these, their mono and diethers and esterethers and diesters, tetrahydrofuran polymer oils, perfluoropolyalkyl ethers and polyphenyl ethers. Perfluoroalkyl ethers have molecular weights of 1000-10000 g/mol. Aliphatic polyether oils have viscosities of 8 to 19 500 $mm^2/s$ at 38° C.

Polyphenyl ethers are prepared by condensation of alkali metal phenolates and halogenobenzenes. Diphenyl ether and its alkyl derivatives are also used.

Examples of ester oils are the alkyl esters of adipic acid, bis-(2-ethylhexyl) sebacate and bis-(3,5,5-trimethylhexyl) sebacate or adipate as well as the esters of natural fatty acids with mono or polyfunctional alcohols such as TMP oleate. Fluorine-containing ester oils form another class. Phosphates include triaryl, trialkyl and alkylaryl phosphates. Examples are tri-(2-ethylhexyl) phosphate and bis-(2-ethylhexyl)-phenyl phosphate.

Silicon-containing oils are silicone oils (polymers of the alkyl and aryl siloxane series) and silicates.

Examples of renewable non-crosslinkable organic media are rapeseed oil, sunflower oil.

Halogenated hydrocarbons and fully halogenated hydrocarbons include chlorinated paraffins such as chlorotrifluoroethylene polymer oils and hexafluorobenzene.

(Non-reactive) solvents according to DIN 55 945 are hexane, special boiling point spirit, white spirit, xylene, solvent naphtha, balsamic turpentine oil, methyl ethyl ketone, methyl isobutyl ketone, methyl amyl ketone, isophorone, butyl acetate, 1-methoxypropyl acetate, butylglycol acetate, ethyldiglycol acetate and N-methyl pyrrolidone (Brock, Thomas, Groteklaes, Michael, Mischke, Peter, Lehrbuch der Lacktechnologie, Curt R. Vincentz Verlag Hannover (1998) 93 et seq).

Particularly preferred non-crosslinkable media include: polyethers, e.g. Baylube 68CL, naphthenic oils e.g. Nynas T 110, paraffinic highly refined mineral oils, e.g. Shell Catanex S 932, ester oils, e.g. methylester SU, oils based on renewable raw materials, e.g. refined rapeseed oil. Particularly preferred non-crosslinkable media (A) are the large class of hydrocarbons, polyether oils and solvents according to DIN 55 945.

Thickening Agent (C)

In the context of the invention, the thickening agents (C) used in the composition according to the invention may also be called swelling agents. They soak up liquids and thus swell (see Römpp Lexikon der Chemie, 10th edition). They are expediently chosen from natural organic thickening agents, derivatives of natural organic thickening agents, synthetic organic thickening agents and inorganic thickening agents. They are particularly preferably chosen from polyureas and substituted polyureas. (Poly)ureas, according to the invention, are intended to include monourea compounds and polyurea compounds. Monourea compounds are those that have a

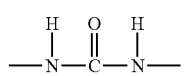

group in the molecule, wherein the free valencies are saturated by at least one organic group, thus urea itself is excepted. According to the invention, however, polyurea compounds that contain at least two

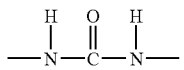

groups in the molecule are particularly preferred. Reference is made to, for example, WO 02/02683 with regard to the method of preparation of suitable polyureas. Other suitable thickening agents include: diurea derivatives, triurea derivatives, tetraurea derivatives, bentonite, hectorite, montmorillonite, highly disperse silicas, synthetic silicas, polyethylene, polypropylene, polytetrafluoroethylene, substituted polyamides, polyimides, simple soaps with different metal bases, e.g. calcium, sodium, lithium stearate soaps, lithium 12-hydroxystearate, aluminum stearate soaps; simple soaps are built up from a metal base and a fatty acid.

All thickener molecules are identical. Mixed soaps with different metal bases; mixed soaps are built up from different metal bases and one fatty acid. Complex soaps with different metal bases, e.g. calcium complex soap, sodium complex soap, lithium complex soap, aluminum complex soap; complex soaps are built up from a metal base, a typical non-fatty acid (.e.g. acetic acid, benzoic acid, boric acid) and a fatty acid; they do not contain uniform identical thickener molecules. Fatty acids in the previously mentioned thickening agents are e.g. caproic, caprylic, capric, lauric, myristic, palmitic, stearic, arachidic, behenic, lignoceric acids as well as hexadecenoic, tetradecenoic, oleic, erucic, castor, linoleic, linolenic, elaeosteric, licanoleic and clupanodonic acids.

Other thickening agents are cellulose ethers, hydroxyethyl cellulose, hydroxypropyl cellulose, polyacrylic and polymethacrylic compounds, vinyl polymers, polycarboxylic acids and polyethers.

The microgels (B) used according to the invention may also have a thickening effect, but they are different from the thickening agents (C) used according to the invention because the latter are not microgels.

Thickening agent (C) used according to the invention is preferably a polyurea thickener, a bentonite, a silica gel or an inorganic soap thickener.

The composition according to the invention preferably contains, added together, 0.1 to 90 wt. % of microgel (B) and thickening agent (C), with respect to the total amount of composition, wherein the ratio by weight of microgel (B) to thickener (C) is from 0.1:99.9 to 99.9:0.1.

More preferably, the ratio by weight of non-crosslinkable organic medium (A) to the sum of microgel (B) and thickener (C) is 70:30 to 99.7:0.3, particularly preferably 80:20 to 90:10.

The composition according to the invention preferably contains 10 to 99.9 wt. % of the non-crosslinkable organic medium (A).

Furthermore, the composition according to the invention preferably contains 0.5 to 90 wt. %, more preferably 2-40 wt. %, even more preferably 5-30 wt. % of the sum of microgel (B) and thickening agent (C), with respect to the total amount of composition.

Furthermore, the composition according to the invention preferably contains 10 to 99.5 wt. %, more preferably 40 to 97 wt. %, even more preferably 50 to 95 wt. %, particularly preferably 60 to 95 wt. % of organic medium (A).

The composition according to the invention preferably comprises the organic non-crosslinkable medium (A), the microgel (B), the thickening agent (C) and optionally the other components mentioned below. The presence of water is not preferred; compositions according to the invention preferably contain less than 0.8 wt. %, more preferably less than 0.5 wt. % of water. Particularly preferably, the presence of water is excluded (<0.1 wt. %). The latter is generally the case for compositions according to the invention as a result of the method of production.

The composition according to the invention may contain additional fillers, pigments and additives such as dispersion aids, oxidation inhibitors, extreme pressure and wear protection additives, solid lubricants, friction modifiers, detergent-dispersant additives, foam inhibitors, pour-point lowerers, adhesion improvers, preservatives, colorants, antistatic agents, degassing agents, flow promoters, flow controllers, auxiliary agents for substrate wetting, anti-deposition agents, auxiliary agents for controlling substrate wetting, to control conductivity, demulsifiers, anticorrosion additives, non-ferrous metal deactivators, agents to modify the coefficient of friction, etc. (W. J. Bartz, Additive in Schmierstoffen 1994 Expert Verlag Renningen-Malmsheim).

The additives mentioned above can be incorporated, in particular uniformly, in compositions according to the invention, which again leads to improvement of the products produced therefrom, such as polymer compositions, lubricants, etc.

Particularly suitable pigments and fillers for producing compositions according to the invention that contain the non-crosslinkable medium (A), and microgel-containing plastics materials produced therefrom are, for example: inorganic and organic pigments, siliceous fillers such as kaolin, talcum, carbonates such as calcium carbonate and dolomite, barium sulfate, metal oxides such as zinc oxide, calcium oxide, magnesium oxide, aluminum oxide, highly disperse silicas (precipitated and thermally produced silicas), the latter not used as thickening agents, metal hydroxides such as aluminum hydroxide and magnesium hydroxide, glass fibers and glass fiber products (slats, strands or glass microbeads), carbon fibers, thermoplastic fibers (polyamide, polyester, aramid), rubber gels based on polychloroprene and/or polybutadiene or also any other previously described gel particles that have a high degree of crosslinking and a particle size of 5 to 1000 nm.

The fillers mentioned may be used singly or as a mixture. In a particularly preferred embodiment of the process, 0.5 to 30 parts by weight of rubber gel (B)+thickening agent (C), optionally together with 0.1 to 40 parts by weight of filler, and 30-99.5 parts by weight of liquid non-crosslinkable medium (A) are used to produce compositions according to the invention.

Compositions according to the invention may contain other auxiliary agents such as antioxidants, heat stabilizers, light protectors, anti-ozone agents, processing auxiliary agents, plasticizers, tackifiers, blowing agents, colorants, waxes, extenders, organic acids and filler activators such as for example trimethoxysilane, polyethylene glycol or others that are known in the industries described.

The auxiliary agents are used in conventional amounts that are governed, inter alia, by the intended use. Conventional amounts are e.g. amounts of 0.1 to 50 wt. %, with respect to the amount of liquid medium (A) used or to the rubber gel (B) used.

In a preferred embodiment the composition according to the invention is produced by mixing at least one non-crosslinkable organic medium (A) that has a viscosity of less than 30000 mPas at a temperature of 120° C. and at least one dry microgel powder (B) (preferably less than 1 wt. %, more preferably less than 0.5 wt. % of volatile matter) (when mixing components (A) and (B), no microgel latices are used) and optionally thickening agent (C) that is preferably not crosslinked by energy-rich radiation, using a homogenizer, a pearl mill, a three-roll mill, a single-screw or multi-screw extruder, a kneader and/or a dissolver, preferably using a homogenizer, a pearl mill or a three-roll mill. Thickening agent (C) may be present during homogenization or added later. It is preferably present during homogenization.

With regard to the viscosity of the composition being produced, a kneader, in which preferably only very highly viscous (almost solid to solid) compositions may be used, can be used to a very restricted extent, i.e. it is used only in special cases.

The disadvantages of a pearl mill are the comparatively restricted viscosity range (tending towards thin compositions), very costly cleaning procedure, expensive product changes for the compositions that can be used and abrasion of the balls and the milling equipment.

Homogenization of the compositions according to the invention is particularly preferably performed in a homogenizer or a three-roll mill. The disadvantage of a three-roll mill is the comparatively restricted viscosity range (tending towards very thick compositions), low throughput and non-sealed mode of operation (poor worker protection).

Homogenization of compositions according to the invention therefore very preferably takes place using a homogenizer. The homogenizer enables the processing of thin and thick compositions with a high throughput (high flexibility). Product changes are possible comparatively rapidly and do not present any problems.

Surprising and new is the fact that microgels (B) can be dispersed in non-crosslinkable organic media; it is particularly surprising that dispersion can be achieved right down to the primary particles (see examples).

Dispersion of microgels (B) and optionally of the thickening agent (C) in the liquid medium (A) is expediently performed in the homogenizer in a homogenizing valve (see FIG. 1).

In the process preferably used according to the invention, agglomerates are subdivided into aggregates and/or primary particles. Agglomerates are physically separable units, during the dispersion of which no change takes place in the size of the primary particles.

FIG. 1 shows the mode of functioning of the homogenizer valve.

The product to be homogenized enters the homogenizer valve at a slow speed and is accelerated to high speed in the homogenizer slit. Dispersion takes place after the slit, mainly due to turbulence and cavitation (William D. Pandolfe, Peder Baekgaard, Marketing Bulletin from APV Homogenizer Group—"High-pressure homogenizers, processes, product and applications").

The temperature of the composition according to the invention when fed into the homogenizer is expediently −40-140° C., preferably 20-80° C. The composition according to the invention being homogenized is expediently homogenized in the machine at a pressure of 20 to 4000 bar, preferably 100 to 4000 bar, preferably 200 to 4000 bar, preferably 200-2000 bar, very preferably 500-1500 bar. The number of passes is governed by the dispersion quality desired for the actual material and may vary between one and 20, preferably one to 10, more preferably one to four passages through the machine.

Compositions produced according to the invention have a particularly fine particle distribution, that is achieved in particular with the homogenizer, that is also extremely advantageous with regard to the flexibility of the process with respect to varying viscosities of the liquid media and the resulting compositions and the temperatures required as well as the dispersed materials.

The invention also provides use of the compositions according to the invention in lubricants, coating agents, adhesives, rubbers, polymers, plastics materials and TPEs. Also the molded items and coatings produced therefrom by conventional processes.

The invention is explained in more detail by looking at the following examples. Obviously, the invention is not restricted to these examples.

EXAMPLES

Microgels, Thickeners and Lubricants Used:

Micromorph 5P is a crosslinked rubber gel with an OH value of 4 based on SBR, from RheinChemie Rheinau GmbH.

Micromorph 1P is a crosslinked, surface-modified rubber gel based on SBR, from RheinChemie Rheinau GmbH.

OBR 1326K is a crosslinked surface-modified rubber gel (laboratory product) based on BR (butadiene rubber), from Lanxess AG.

OBR 1295 is a crosslinked, non-surface-modified rubber gel (laboratory product) based on acrylonitrile, from Lanxess AG (Table 1).

Additin M 10411 is a polyurea thickener, from RheinChemie Rheinau GmbH.

Nynas T 110 is a hydrogenated naphthenic oil, from Nynas Naphthenics AB.

TABLE 1

Composition of the microgels OBR 1295, OBR 1326K, Micromorph 1P and Micromorph 5P.

| Name | butadiene | styrene | ACN | EGDMA | TMPTMA | HEMA | Notes |
|---|---|---|---|---|---|---|---|
| OBR 1295 | — | — | 94 | — | 6 | — | |
| OBR 1326K | 87 | — | | | 3 | 10 | BR |
| Micromorph 1P | 12 | 80 | — | 5 | — | 3 | SBR |
| Micromorph 5P | 61 | 39 | — | — | — | — | 2,5-DCP[1] |

[1] DCP - dicumyl peroxide

The characteristic data for the gels are summarized in Table 2.

TABLE 2

Properties of the microgels Micromorph 1P, Micromorph 5P, OBR 1326K and OBR 1295.

| | | | | | | | | | Tg step DSC/ |
|---|---|---|---|---|---|---|---|---|---|
| | | | | Particle | | Gel | OH value | | 2nd |
| | Gel | $d_{50}$ | $O_{spec}$ | density | Tg | [wt. | [mg | Acid | heating |
| Microgel | type | [nm] | [m²/g] | [g/ml] | [° C.] | %] | QI | KOH/g] | value | [° C.] |
| OBR 1295 | ACN | 106 | — | 1.182 | 106 | — | — | — | — | 27 |
| OBR 1326K | BR | 49 | 123 | 0.928 | −77.0 | 97 | 8 | 41 | 5 | 8 |
| Micromorph 1P | SBR | 69 | — | — | 56 | 96 | 7.4 | 41 | 0.4 | — |
| Micromorph 5P | SBR | 57 | 111 | — | — | 92 | <5 | 4 | 1 | — |

Key to Table:
DCP: dicumyl peroxide $d_{50}$: The diameter $d_{50}$ is defined as the mean according to DIN 53 206. It represents the mean diameter of the particles in the latex. The particle diameter of the latex particles was determined here using ultracentrifuging (W. Scholtan, H. Lange: "Bestimmung der Teilchengrössenverteilung von Latices mit der Ultrazintrifuge", Kolloid-Zeitschrift und Zeitschrift für Polymere (1972) vol. 250, issue 8). The diameter data for the latex and for the primary particles in the compositions according to the invention are virtually identical because the particle sizes of the microgel particles are not altered during production of the composition according to the invention.

$T_g$: Glass Transition Temperature

To determine $T_g$ and $\Delta T_g$: a Perkin-Elmer DSC-2 instrument is used.

Swelling Index QI

The swelling index QI was determined as follows:

The swelling index is determined from the weight of the swollen solvent-containing microgel after standing in toluene at 23° C. for 24 hours and the weight of the dry microgel:

$Qi$ = wet weight of the microgel/dry weight of the microgel.

To determine the swelling index, 250 mg of the microgel is swollen in 25 ml of toluene for 24 hours, with shaking. The (wet) gel swollen with toluene is weighed after centrifuging at 20 000 rpm and is then dried to constant weight at 70° C. and weighed again.

OH Value (Hydroxyl Value)

The OH value (hydroxyl value) is determined in accordance with DIN 53240, and corresponds to the amount of KOH in mg that is equivalent to the amount of acetic acid that is released from 1 g of substance during acetylation with acetanhydride.

Acid Value

The acid value is determined, as mentioned above, in accordance with DIN 53402 and corresponds to the amount of KOH in mg that is required to neutralize 1 g of polymer.

Gel Content

The gel content corresponds to the proportion that is insoluble in toluene at 23° C. The gel content is given by the quotient of the dry residue and the amount initially weighed out and is cited as a percentage by weight.

Preparation Example 1 to give Micromorph 1P

Micromorph 1P is a microgel based on hydroxyl-modified SBR, prepared by direct emulsion polymerization using the crosslinking comonomer ethylene glycol dimethacrylate.

325 g of the Na salt of a long-chain alkylsulfonic acid (330 g Mersolat K30/95 from Bayer AG) and 235 g of the Na salt of methylene-bridged naphthalenesulfonic acid (Baykanol PQ from Bayer AG) are dissolved in 18.71 kg of water and placed in a 40 l autoclave. The autoclave is evacuated 3 times and filled with nitrogen. Then 8.82 kg of styrene, 1.32 kg of butadiene, 503 g of ethylene glycol dimethacrylate (90%), 314 g of hydroxyethyl methacrylate (96%) and 0.75 g of hydroquinone monomethyl ether are added. The reaction mixture is heated to 30° C. with stirring. Then an aqueous solution consisting of 170 g of water, 1.69 g of ethylenediamine tetraacetic acid (Merck-Schuchardt), 1.35 g of iron(II) sulfate*7H$_2$O, 3.47 g of Rongalit C (Merck-Schuchardt) and 5.24 g of trisodium phosphate*12H$_2$O are added. The reaction is started by adding an aqueous solution of 2.8 g of p-menthane hydroperoxide (Trigonox NT 50 from Akzo-Degussa) and 10.53 g of Mersolat K 30/95 dissolved in 250 g of water. After a reaction time of 5 hours, the mixture is post-activated with an aqueous solution consisting of 250 g of water, in which 10.53 g of Mersolat K30/95 and 2.8 g of p-menthane hydroperoxide (Trigonox NT 50) are dissolved. After achieving a polymerization conversion of 95-99%, polymerization is terminated by adding an aqueous solution of 25.53 g of diethylhydroxylamine, dissolved in 500 g of water. Then unreacted monomers are removed from the latex by stripping with steam. The latex is filtered and stabilizer is added, as in U.S. Pat. No. 6,399,706, and the latex is coagulated and dried.

Micromorph 5P is prepared in the same way. The dry further processable microgel powders Micromorph 1P and Micromorph 5P were obtained from the latex by spray-drying.

Preparation Example 2 to Give Micromorph 5P (Peroxidically Crosslinked Microgels)

The microgel is prepared by crosslinking an SBR latex containing 39 wt. % of styrene (Krylene 1721 from Bayer France) in the latex form with 2.5 phr of dicumyl peroxide (DCP).

Crosslinking of Krylene 1721 with dicumyl peroxide is performed in the same way as described in examples 1)-4) in U.S. Pat. No. 6,127,488, wherein 2.5 phr of dicumyl peroxide were used for the crosslinking process.

Before using the microgel, it is dried to constant weight at 100 bar in a vacuum drying cabinet from Heraeus Instruments, model Vacutherm VT 6131.

Preparing the Compositions According to the Invention

To prepare the composition according to the invention, the non-crosslinkable organic medium and the relevant microgel and the thickener Additin 10411 were added together in a dissolver, with stirring. The mixture was allowed to stand for at least one day and then further processed with the homogenizer. The composition according to the invention was placed in the homogenizer at room temperature and passed four times through the homogenizer at 900 to 1000 bar, under batch operation. During the first passage, the microgel paste heated up to about 40° C., during the second passage to about 70° C. After that the microgel paste was cooled to room temperature by allowing it to stand and then the process was repeated until four passages had been accomplished.

The rheological properties of the composition were determined using a Rheometer MCR300 from Physica. The measurement unit used was a CP 50-2 plate-and-cone system. The measurements were performed at 20° C. (shear programme: temperature=20° C.).

Table 3 gives the viscosities η that were measured at shear rates ν' of 5 $s^{-1}$, 100 $s^{-1}$, 1000 $s^{-1}$ and 0.1 $s^{-1}$.

The following abbreviations are used in the Table:
NT110 Nynas T110
A10411 Additin 10411
4× Passed 4 times through the homogenizer Table 3 shows that the viscosities are increased by combining Additin 10411 with the microgel in Nynas T110, as compared with an Additin-free composition.

What is claimed is:

1. A composition comprising:
   at least one non-crosslinkable organic medium (A) having a viscosity of less than 30000 mPas at a temperature of 120° C.;
   at least one crosslinked microgel (B) comprising a functional group selected from the group consisting of aldehyde, carboxyl, nitrile, mercapto, dithiocarbamate, polysulfide, xanthogenate, thiobenzthiazole, dithiophosphoric acid, unsaturated dicarboxylic acid, epoxy, amine, acid amine, acid anhydride, isocyanate and unsaturated groups; and
   at least one urea compound selected from the group consisting of polyureas, substituted polyureas, diurea derivatives, triurea derivatives, tetraurea derivatives, and polyurea derivatives.

2. The composition according to claim 1, in which the non-crosslinkable organic medium (A) has a viscosity of less than 1000 mPas at a temperature of 120° C.

TABLE 3

Rheological properties of an Additin 10411-microgel (Micromorph 1P and 5P, OBR 1326K, OBR 1295) combinations in Nynas T110

| Name | Microgel MG type | MG concentration [%] | PU-V concentration [%] | Dispersion | η at γ = 5 $s^{-1}$ [Pa * s] | η at γ = 100 $s^{-1}$ [Pa * s] | η at γ = 1000 $s^{-1}$ [Pa * s] | η at γ = 0.1 $s^{-1}$ [Pa * s] | γ(0.1 $s^{-1}$)/γ(1000 $s^{-1}$) [ ] |
|---|---|---|---|---|---|---|---|---|---|
| M.5P-NT110 (14%)-4x | M.5P | 14.10 | 0.00 | 4x | 38 | 3.4 | 1.76 | 488 | 277.3 |
| M.5P-A10411-NT110 (11:4)-4x | | 11.20 | 3.75 | 4x | 133 | 9.0 | 2.53 | 1070 | 422.9 |
| M.5P-A10411-NT110 (9:5)-4x | | 9.25 | 4.75 | 4x | 156 | 8.6 | 2.44 | 1270 | 520.5 |
| M.5P-A10411-NT110 (7:7)-4x | | 7.00 | 7.00 | 4x | 224 | 10.8 | 2.68 | 1030 | 384.3 |
| M.5P-A10411-NT110 (5:10)-4x | | 5.25 | 9.75 | 4x | 202 | 10.6 | 2.71 | 5700 | 2103.3 |
| M.1P-NT110 (14%)-4x | M.1P | 14.10 | 0.00 | 4x | 2.9 | 1.4 | 1.03 | 3.2 | 3.1 |
| M.1P-A10411-NT110 (11:4)-4x | | 11.20 | 3.75 | 4x | 24 | 3.3 | 1.62 | 553 | 341.4 |
| M.1P-A10411-NT110 (9:5)-4x | | 9.25 | 4.75 | 4x | 46 | 4.6 | 1.83 | 1310 | 715.8 |
| M.5P-A10411-NT110 (7:7)-4x | | 7.00 | 7.00 | 4x | 55 | 5.0 | 1.98 | 753 | 380.3 |
| M.5P-A10411-NT110 (5:10)-4x | | 5.25 | 9.75 | 4x | 162 | 10.7 | 2.69 | 1370 | 509.3 |
| OBR 1326K-NT110(14%)-4x | OBR1326K | | | 6x | 93 | 6.1 | 0.98 | 310 | 316.3 |
| OBR 1326K-A10411-NT110(11:4)-4x | | | | 6x | 201 | 10.0 | 1.52 | 1770 | 1164.5 |
| OBR 1326K-A10411-NT110(9:5)-4x | | 9.00 | 5.00 | 6x | 225 | 15.7 | 3.96 | 3010 | 760.1 |
| OBR 1326K-A10411-NT110(7:7)-4x | | 7.00 | 7.00 | 6x | 347 | 13.9 | 2.98 | 4550 | 1526.8 |
| OBR 1326K-A10411-NT110(5:10)-4x | | 5.00 | 10.00 | 6x | 348 | 11.5 | 2.67 | 962 | 360.3 |
| OBR 1295-NT110(14%)-4x | OBR 1295K | 14.10 | 0.00 | 4x | 28 | 3.5 | 1.46 | 599 | 410.3 |
| OBR 1295-A10411-NT110(11:4)-4x | | 11.20 | 3.75 | 4x | 53 | 4.2 | 1.55 | 1120 | 722.6 |
| OBR 1295K-A10411-NT110(9:5)-4x | | 9.25 | 4.75 | 4x | 60 | 4.5 | 1.63 | 1210 | 742.3 |
| OBR 1295K-A10411-NT110(7:7)-4x | | 7.00 | 7.00 | 4x | 53 | 4.4 | 1.69 | 1500 | 887.6 |
| OBR 1295K-A10411-NT110(5:10)-4x | | 5.25 | 9.75 | 4x | 209 | 9.1 | 2.12 | 4420 | 2084.9 |

3. The composition according to claim 1, in which the non-crosslinkable organic medium (A) has a viscosity of less than 200 mPas at a temperature of 120° C.

4. The composition according to claim 1, wherein the primary particles in the microgel (B) have an approximately spherical geometry.

5. The composition according to claim 1, wherein the difference in the diameters of an individual primary particle in the microgel (B), defined as $$[(d1-d2)/d2] \times 100\%,$$

in which d1 and d2 are any two diameters of the primary particle and d1>d2, is less than 250%.

6. The composition according to claim 5, in which the difference in the diameters of an individual primary particle in the microgel (B) is less than 50%.

7. The composition according to claim 1, wherein the primary particles in the microgel (B) have an average particle size of 5 to 500 nm.

8. The composition according to claim 1, wherein the primary particles in the microgel (B) have an average particle size of less than 99 nm.

9. The composition according to claim 1, wherein a proportion of at least about 70 wt.% of the microgel (B) is insoluble in toluene at 23° C.

10. The composition according to claim 1, wherein the microgel (B) has a swelling index of less than 80 in toluene at 23° C.

11. The composition according to claim 1, wherein the microgel (B) has a glass transition temperatures of −100° C. to +120° C.

12. The composition according to claim 1, wherein the microgel (B) is crosslinked by means other than energy-rich radiation.

13. The composition according to claim 1, wherein the microgel (B) has a glass transition region with a width greater than about 5° C.14

14. The composition according to claim 1, wherein the microgel (B) is obtainable by emulsion polymerization.

15. The composition according to claim 1, wherein the microgel (B) is based on rubber.

16. The composition according to claim 1, wherein the microgel (B) is based on homopolymers or random copolymers.

17. The composition according to claim 1, wherein the microgel (B) is modified by functional groups that can react with C=C double bonds.

18. The composition according to claim 1, in which the non-crosslinkable medium (A) comprises at least one compound selected from the group consisting of solvents, saturated aromatic hydrocarbons, aromatic hydrocarbons, polyether oils, natural ester oils, synthetic ester oils, polyetherester oils, phosphates, silicon-containing oils, halogenated hydrocarbons and liquid renewable raw materials.

19. The composition according to claim 1 that contains in total 0.1 to 90 wt.% of the microgel (B) and the thickening agent (C), with respect to the total amount of composition, wherein the ratio by weight of the microgel (B) to urea compound (C) is from 0.1:99.9 to 99.9:0.1.

20. The composition according to claim 1, comprising from 10 to 99.9 wt.% of the non-crosslinkable organic medium (A).

21. The composition according to claim 1, further comprising at least one filler and/or additive.

22. The composition according to claim 21, in which the additive is selected from the group consisting of oxidation and corrosion inhibitors, extreme pressure and wear protection additives, friction modifiers, detergent-dispersant additives, dispersion aids, foam inhibitors, pour-point lowerers, adhesion improvers, preservatives, pigments, colorants, and antistatic agents.

23. The composition according to claim 1, prepared by mixing the non-crosslinkable medium (A) and the microgel (B) by means of a homogenizer, a pearl mill (mechanically agitated ball mill), a three-roll mill, a single-screw or multi-screw extruder, a kneader, an Ultra-Turrax machine and/or a dissolver.

24. The composition according to claim 23, prepared using a homogenizer, a pearl mill (mechanically agitated ball mill), a three-roll mill or a dissolver.

25. The composition according to claim 1, having a viscosity of 2 mPas to 100000000 mPas at a speed of 5 s$^{-1}$ (determined at 20° C. using a cone-and-plate measurement system according to DIN 53018).

26. The composition according to claim 1, wherein the microgel (B) has a swelling index of 1 to 15 in toluene at 23° C.

27. The composition according to claim 1, wherein a proportion of at least 95 wt.% of the microgel (B) is insoluble in toluene at 23° C.

28. The composition according to claim 1, wherein the microgel is not modified.

29. A plastics material, rubber, thermoplastic elastomer, coating agent or lubricant comprising the composition according to claim 1.

30. A process for preparing the composition according to claim 1, comprising: dispersing the urea compound (C) and the microgel (B), having an average particle diameter for the primary particles of 5 to 500 nm, in the non-crosslinkable organic media.

31. The process according to claim 30, in which the composition based on the non-crosslinkable organic medium is subjected to thermal treatment and/or treatment using a homogenizer, a ball mill, a pearl mill, a roll mill, a three-roll mill, a single-screw or multi-screw extruder, a kneader, an Ultra-Turrax machine and/or a dissolver, wherein the urea compound (C) is mixed in common with components (A) and (B).

32. The Process according to claim 30, in which the composition based on the non-crosslinkable organic medium is subjected to thermal treatment and/or treatment using a homogenizer, a ball mill, a pearl mill, a roll mill, a three-roll mill, a single-screw or multi-screw extruder, a kneader, an Ultra-Turrax machine and/or a dissolver, wherein the urea compound (C) is added after components (A) and (B) have been mixed.

* * * * *